(12) United States Patent
Haack et al.

(10) Patent No.: US 7,744,984 B2
(45) Date of Patent: Jun. 29, 2010

(54) METHOD OF TREATING SUBSTRATES FOR BONDING

(75) Inventors: Larry Haack, Ann Arbor, MI (US); Ann Straccia, Southgate, MI (US); Joe Holubka, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 893 days.

(21) Appl. No.: 11/427,023

(22) Filed: Jun. 28, 2006

(65) Prior Publication Data

US 2008/0003436 A1    Jan. 3, 2008

(51) Int. Cl.
*B32B 17/00* (2006.01)

(52) U.S. Cl. .................. 428/210; 428/426; 134/1.1; 156/281; 156/331.7

(58) Field of Classification Search .................. None
See application file for complete search history.

(56) References Cited

U.S. PATENT DOCUMENTS

| | | | |
|---|---|---|---|
| 3,811,925 A * | 5/1974 | Nesteruk .................. 427/486 |
| 4,682,711 A | 7/1987 | Reighard et al. |
| 4,724,106 A | 2/1988 | Morimoto et al. |
| 4,981,824 A * | 1/1991 | Yonemura et al. .......... 501/146 |
| 5,130,265 A | 7/1992 | Battilotti et al. |
| 5,169,675 A | 12/1992 | Bartoszek-Loza et al. |
| 5,185,182 A | 2/1993 | Brown |
| 5,376,413 A | 12/1994 | Callebert et al. |
| 5,437,894 A | 8/1995 | Ogawa et al. |
| 5,580,616 A | 12/1996 | Niino et al. |
| 5,702,772 A | 12/1997 | Skelly et al. |
| 5,730,922 A | 3/1998 | Babb et al. |
| 5,820,808 A | 10/1998 | van Oene et al. |
| 5,820,991 A * | 10/1998 | Cabo .......................... 428/432 |
| 5,829,804 A | 11/1998 | Saeki et al. |
| 5,837,958 A | 11/1998 | Foernsel |
| 5,885,716 A * | 3/1999 | Nagasawa et al. ........... 428/469 |
| 5,916,674 A | 6/1999 | Skelly et al. |
| 6,218,004 B1 | 4/2001 | Shaw et al. |
| 6,306,514 B1 * | 10/2001 | Weikel et al. ............... 428/451 |
| 6,503,564 B1 | 1/2003 | Fleming et al. |

(Continued)

FOREIGN PATENT DOCUMENTS

EP    0684281    11/1995

(Continued)

OTHER PUBLICATIONS http://www.americanelements.com/biox.html (Feb. 23, 2009).*

(Continued)

*Primary Examiner*—Mark Ruthkosky
*Assistant Examiner*—Sathavaram I Reddy
(74) *Attorney, Agent, or Firm*—Damian Porcari; Brooks Kushman P.C.

(57) ABSTRACT

A method of treating a glass substrate for bonding. The method includes providing a glass substrate having a fritted portion of a ceramic frit material and a non-fritted portion. At least a portion of the fritted portion includes a bondable surface. The method further includes cleaning and activating the bondable surface for subsequent bonding. The cleaning and bonding steps are carried out by applying an air plasma to the bondable surface.

17 Claims, 4 Drawing Sheets

U.S. PATENT DOCUMENTS

| | | | |
|---|---|---|---|
| 6,649,225 | B2 | 11/2003 | Drzal et al. |
| 6,740,399 | B1* | 5/2004 | George et al. .......... 428/355 EP |
| 6,793,759 | B2 | 9/2004 | Chaudhury et al. |
| 6,800,336 | B1 | 10/2004 | Foernsel et al. |
| 6,821,379 | B2 | 11/2004 | Datta et al. |
| 6,841,263 | B2 | 1/2005 | Anderson et al. |
| 6,875,303 | B2 | 4/2005 | Samurkas et al. |
| 7,176,268 | B2 | 2/2007 | Lai et al. |
| 2002/0129833 | A1 | 9/2002 | Drzal et al. |
| 2003/0091818 | A1 | 5/2003 | Banba et al. |
| 2003/0098114 | A1* | 5/2003 | Samurkas et al. ........... 156/108 |
| 2003/0116281 | A1 | 6/2003 | Herbert et al. |
| 2003/0138573 | A1 | 7/2003 | Mikhael et al. |
| 2003/0155332 | A1 | 8/2003 | Datta et al. |
| 2003/0207099 | A1 | 11/2003 | Gillmor et al. |
| 2003/0207145 | A1 | 11/2003 | Anderson et al. |
| 2005/0123705 | A1 | 6/2005 | Dronzek et al. |
| 2006/0118242 | A1 | 6/2006 | Herbert et al. |
| 2006/0162740 | A1 | 7/2006 | Kurunczi |
| 2006/0178483 | A1* | 8/2006 | Mehta et al. ................ 525/240 |
| 2006/0237030 | A1 | 10/2006 | Hensley |
| 2006/0263529 | A1 | 11/2006 | Lustiger et al. |

FOREIGN PATENT DOCUMENTS

| | | |
|---|---|---|
| EP | 0 370 779 B1 | 2/1996 |
| EP | 1 524 548 A1 | 4/2005 |
| EP | 0 990 682 B1 | 11/2005 |
| WO | 0060640 | 10/2000 |
| WO | 00/71340 | 11/2000 |
| WO | 03/000612 A1 | 1/2003 |
| WO | 03048067 A1 | 6/2003 |
| WO | 2004/037936 A1 | 5/2004 |
| WO | 2005059040 | 6/2005 |
| WO | 2005089957 | 9/2005 |

OTHER PUBLICATIONS

S. Gar/G. Vergason, "Plasma Polymerization: Theory and Practice" Vergason Technology, Inc., Van Etten, NY.

Autoglass Online, Industry Update, "Contamination Alleged, Accusations Fly", News & Events, Sep./Oct. 2004, www.glass.org/autoglass/maraprnews.htm.

SATAjet RP—http://www.sata.com/Produkte/produkt.jsp?index=02-01—5 Pages.

The Patent Office Patents Directorate—Patents Act 1977: Search Report under Section 17(5); Dec. 21, 2006; 3 Pages.

Modification of Polymeric Material Surfaces with Plasmas, Coates et al., Chapter IV of Plasma Processing of Advanced Materials MRS Bulletin, Aug. 1996.

Plasma Surface Treatment in Composites Manufacturing, Chang, Journal of Industrial Technology, vol. 15, No. 1 (Nov. 1998-Jan. 1999).

Surface Modification of Textile Fibers for Improvement of Adhesion to Polymeric Matrices: A Review, S. Luo et al.; Journal of Adhesion Science and Technology, (2002) 16(13), 1715-1735.

Chemical Reactions at Substrate Surface in Plasma Process, Y. Ando et al., Yosha (2002), 39(3), 23-127.

Improved Adhesion of Low-Density Polyethylene/EVA Foams Using Different Surface Treatments, M.D. Landete-Ruiz, et al., Journal of Adhesion Science and Technology (2002, 16(8), 1073-1101.

Surface Treatment of Biomedical Polymers for Enhanced Adhesion, V. Barron, et al. Materials Research Society Symposium Proceedings (2001), 662.

Plasma Surface Treatments of Melt-Extruded Sheets of Poly(L-lactic acid), T. Hirotsu, Polymer Engineering and Science (2002) 42(2), 299-306.

Study of Physico-Chemical Surface Treatments on Dyeing Properties of Polyamides. Part 1: Effect of Tetrafluoromethane Low Temperature Plasma, J. Yip, Coloration Technology (2002), 118(1), 26-30.

Plasma Surface Treatment of Aerospace Materials for Enhanced Adhesive Bonding, W. Leahy et al., Journal of Adhesion (2001), 773(3), 215-249.

Review of Progress n Surface Treatments for Magnesium Alloys, M. Yao, Cailiao Baohu (2001), 34(10), 19-21.

TOF-SIMS Ability to Quantify Surface Chemical Groups: Correlation with XPS Analysis and Spectrochemical Titration, N. Medard, et al., Belg. Surface and Interface Analysis (2001), 31(11), 1042-1047.

Surface Modification of Polymer Surfaces: Atmospheric Plasma Versus Vacuum Plasma Treatments, M. Shenton, Journal of Physics D: Applied Physics (2001), 34(18), 2761-2768.

Plasma Processing of Polymers for Enhanced Adhesion to Metals and Other Materials, F. Arefi-Khonsari et al., High Temperature Material Processes (2000), 4(4), 537-551.

Improvement of Adhesive Properties of Low Density Polyethylene Sheets and Poly(ethylene terephthalate) films by Various Surface Treatments, T. Ogawa et al., Kobunshi Ronbunshu (2000), 57(11), 708-714.

Surface Treatment of Polymer Matrix Composites for Adhesion, V. Barron et al., Proceedings of the Annual Meeting of the Adhesion Society (2000), 23rd 544-546.

Different Surface Treatments to Improve the Adhesion of Polypropylene, T. Zeiler, et al., Journal of Adhesion Science and Technology (2000), 14(5), 619-634.

Correlation Between Surface Tension and Physical Paint Properties, M. Osterhold et al., Progress in Organic Coatings (1998), 33(3-4), 197-201.

Plasma Surface Treatment for Improved Wettability and Rewettability, P. Spence, et al. INDA-TEC 97, International Nonwovens Technical Conference, Book of Papers, Cambridge, MA Sep. 8-10, 1997 (1997).

Ion Beam and Plasma Technology Development for Surface Modification at Los Alamos National Laboratory, H. Davis, et al. Materials Chemistry and Physics (1998), 54(1-3), 213-218.

Improvement of Adhesive Bonding of Thermoplastic Polymers by Different Surface Treatments, T. Zeiler et al., Macromolecular Symposia (1998), 126 (6th Dresden Polymer Discussion Surface Modification, 1997), 267-281.

A Review of Methods for Improving the Interfacial Adhesion Between Carbon Fiber and Polymer Matrix, L. Tang et al. Polymer Composites (1997), 18(1), 100-113.

Imaging Chemiluminescence Instrument for the Study of Heterogeneous Oxidation Effects in Polymers, G. Ablblad et al. Polymer Testing (1997), 16(1), 59-73.

Polymer Surface Modification by Plasmas and Photons, C.-M. Chan et al., Surface Science Reports (1996), 24(½), 1'-54.

Contact Angle Titration and ESCA Analysis of Polyester Surfaces Modified by Flame and Corona Surface Treatments, E. Wallace, Jr. et al., Annual Tech.Conf.-Soc. of Plastics Engs. (1995), 53rd(vol. 2), 2452-6.

Long-Term Performance of Adhesively Bonded Low Density Polyethylene After Various Surface Treatments for Enhanced Adhesion, D.Wu et al., Materials Science Forum (1995), 189-190(Interfaces II), 221-7.

Modification of Barrier Properties of Polymeric Films of LDPE and HDPE by Cold Plasma Treatment, A. Rossi et al. Journal of Polymer Engineering (1995), 14(2-3), 191-7.

Interface/Interphase Studies in Epoxy Matrix Composites, B. Okhuysen et al., Journal of Adhesion (1994), 45(1-4), 3-14.

Surface Treatment of Glass Fibers by Plasma, D. Wang et al., Xi'an Jiaotong Daxue Zuebao (1989), 23(5), 27-33 (Journal written in Chinese).

A System for in Situ Studies of Plasma-Surface Interactions Using X-ray Photoelectron Spectroscopy, J. Vossen et al., Journal of Vacuum Science & Technology, A:Vacuum, Surfaces, and Films (1983), 1(3), 1452-5.

Effects of Various Surface Treatments n Adhesive Bonding of Polyethylene, A. Devine et al., Adhesives Age (1969), 12 (5), 35-7.

Surface Treatment of Plastics by Plasmajet, K. Kiyozumi et al., Nippon Setchaku Kyokaishi (1970), 6(4), 265-72.

Formation of Epoxy-Diamine/Metal Interphases, A. Roche et al., International Journal of Adhesion and Adhesives (2002), 22(6), 431-441.

Method and Apparatus, With Redundancies, For Treating Substrate Plastic Parts to Accept Paint without Using Adhesion Promoters, Brynolf, Russell; Elberson, Michael D., US Pat. Appln. Publ. (2002).

Novel Metal Pretreatments for Improved Adhesion of Paints Using Plasma Methods, W. Van Ooij et al., Int'l Congress of Adh.Science and Tech., etc., Amsterdam, Oct. 16-20, 1995 (1998) Meeting Date 1995, 355-371.

Mechanisms of Atmospheric Corrosion of Precoated Sheets, C.Barreau et al., Comm'n of the Euro.Comm., [Report] EUR (1997), (EUR 16720), 1-114.

Surface Treatment of Propylene Resin Molded Articles for Improved Paint Coatability, Shinonage, Hideo; Sogabe, Satoru, Eur. Pat. Appln. (1995).

Selected pages from Website http://www.iap.fraunhofer.de (14 pages).

Selected pages from Website http://www.ifam.fhg.de (12 pages).

Surface Modification of Polymeric Materials by Atmospheric Plasma Treatment, Y. Tsuchiya et al., Nippon Paint Col, Ltd., Proceedings-Int's Conf. In Org. Coatings, etc. 23rd, Athens, Jul. 7-11, 1997 (1997), pp. 257-270.

On The Energy Balance of Substrate Surfaces During Plasma Cleaning of Lubricants, H. Kersten et al., Vacuum/ vol. 48 (1997), 48(2), pp. 123-128.

European Search Report, Dated Oct. 19, 2007, Ford Global Technologies, LLC, Application No. 07109042.7-1218, Reference P7974.

Ebru Akdogan et al., "A New Method For Immunosensor Preparation: Atmospheric Plasma Torch", Surface & Coatings Technology 201 (2006), pp. 2540-2546.

R. Prat et al., "Polymer Deposition Using Atmospheric Pressure Plasma Glow (APG) Discharge", Polymer 41 (2000), pp. 7355-7360.

European Search Report, dated Oct. 19, 2007, Ford Global Technologies, LLC, Application No. 07109042.7-1218, Reference P7974.

* cited by examiner

METHOD OF TREATING SUBSTRATES FOR BONDING

BACKGROUND OF THE INVENTION

1. Field of the Invention

One aspect of the present invention relates to a method for treating a substrate prior to bonding. Another aspect of the present invention relates to a method for bonding substrates.

2. Background Art

In the automotive industry, substantial resources are expended in developing effective windshield bonding processes to account for the typical contamination present under manufacturing conditions. Once a windshield is formed and before the windshield is bonded to the vehicle frame, contaminants may collect and/or settle on the windshield, thereby dirtying the windshield. The existence of contaminants on windshields was documented as an "Industry Update" in the March/April 2003 issue of AutoGlass magazine, available at http://www.glass.org/autoglass/maraprnews.htm. This article proposes the application of a solvent cleaning solution followed by manual scrubbing for cleaning and prepping the dirty windshield before bonding.

According to another proposal, the process of bonding automotive glass, e.g. windshields, side windows, and rear windows, includes the duplicate application of a primer for cleaning and priming the glass substrate, followed by a second primer step, followed by adhesively joining the glass substrate to a vehicle frame with an adhesive.

The first priming step includes priming the glass substrate with a red primer, for example, Betaseal 43519, available from Dow Chemical of Midland, Mich. The red primer contains a coupling agent to chemically modify the substrate surface. The red primer is highly diluted in a solvent blend that is similar to that typically used for other generic cleaning applications carried out at an automotive manufacturing facility, e.g. the cleaning of body surfaces before painting and the cleaning of body side moldings before adhesive bonding. Non-limiting examples of suitable solvents include any of a variety of aprotic solvents, such as toluene and xylene.

The second priming step includes priming the glass substrate with a black primer, for example Betaseal 43520A, available from Dow Chemical. The black primer is typically a thicker paint-like layer that chemically bonds to the coupling agent imparted by the first red primer layer, and adds bonding functionality to adhere to the subsequently applied adhesive material.

Problematically, the red and black primers cannot be consistently and reliably applied in an assembly plant environment. In general, both primers are commonly applied by hand, which may involve human error. For instance, in automotive manufacturing facilities, the red primer is commonly referred to by name as a "cleaner". If the red primer is mistakenly identified as simply a cleaning solvent, the red primer may be applied as if it were a cleaning solvent. Since a solvent cleaning step does not require as much precision as a primer priming step, this mistake may detrimentally affect the effectiveness of the red primer application. If the glass is perceived already as a clean surface, the step may be mistakenly viewed as unnecessary, instead of being viewed properly as applying a coupling agent for the black primer. This mistake may lead to the omission of the red primer application step.

Moreover, the red primer is invisible to the human eye once applied to the glass surface. Yet, the black primer must be applied exactly over the area of application of the "invisible" red primer. If the application does not match, the resulting adhesive bond between the glass and the frame may be compromised. Further, the black primer only adheres to a glass substrate that has been modified by the coupling agent of the red primer, and does not directly adhere to a fritted glass. Thus, if the black primer is not applied correctly, adhesion to the fritted glass may not occur.

If the adhesion is unacceptable, the windshield may be scrapped, or used for other purposes, at a cost to the manufacturer. Additionally, environmental concerns exist regarding the solvent cleaner, and the red and black primers, as these compounds may contain volatile components that result in the necessity of venting solvent fumes.

In light of the foregoing, a method of treating substrates for bonding that increases reliability of the resulting substrate bond is needed. What is also needed is a method that simplifies and/or automates the bonding process.

SUMMARY OF THE INVENTION

One aspect of the present invention relates to a method and system of treating substrates for bonding that increases the reliability of the resulting substrate bond. Examples of suitable substrates include, without limitation, glass and coated glass. One example of a coating is a ceramic frit. Another aspect of the present invention is a method and system that simplifies and/or automates a glass bonding process. Advantageously, certain aspects of the present invention include treating substrates for bonding without the use of solvent-based primers.

According to a first embodiment of the present invention, a method of treating a glass substrate for bonding is disclosed. The method includes providing a glass substrate having a fritted portion of a ceramic frit material and a non-fritted portion. At least a portion of the fritted portion comprises a bondable surface. The method further includes cleaning the bondable surface for subsequent bonding and activating the bondable surface for subsequent bonding. The cleaning and activating steps are carried out by applying air plasma to the bondable surface.

According to another embodiment of the present invention, a pretreated fritted glass substrate for use in subsequent bonding is disclosed. The substrate includes a substrate having a fritted portion. The fritted portion includes a bondable surface portion. The substrate also includes a contaminant layer at least partially contacting the bondable surface portion of the substrate. The contaminant layer has an atomic concentration percentage of Si as silicone of less than 5.0 percent.

According to yet another embodiment of the present invention, a method of providing a glass substrate for bonding to a frame is disclosed. The method includes providing a glass substrate having a fritted portion of a ceramic frit material and a non-fritted portion, directing an air plasma onto the surface of the fritted portion, and applying an adhesive to the fritted portion for subsequent bonding to the frame.

DETAILED DESCRIPTION OF EMBODIMENTS OF THE PRESENT INVENTION

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a single material, compound or constituent or a group or class of materials, compounds or constituents as suitable for a given purpose in connection with the present invention implies that mixtures of any two or more single materials, compounds or constituents and/or groups or classes of materials, compounds or constituents are also suitable. Also, unless expressly stated to the contrary, percent, "parts of," and ratio values are by weight. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Figure 1:
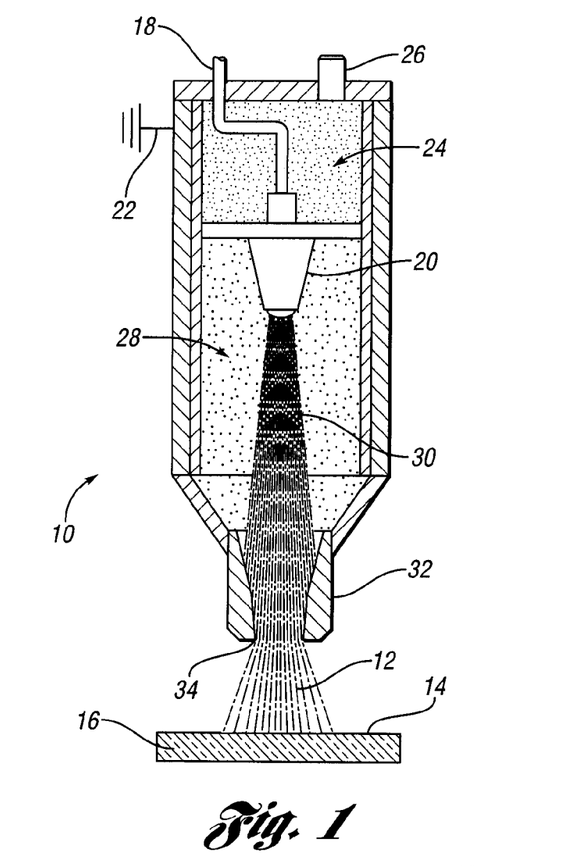
FIG. 1 depicts a cross-sectional, schematic view of an atmospheric pressure air plasma (APAP) device according to one embodiment of the present invention.

FIG. 1 depicts a cross-sectional view of an atmospheric pressure air plasma (APAP) device 10 suitable for applying an air plasma stream 12 to a bonding surface 14 of a substrate 16. Non-limiting examples of substrate 16 include glass and fritted glass. Other examples include, but are not limited to, polycarbonate glazing or other polymeric glazing, chemical vapor deposited metal oxide coatings on polycarbonate or other polymeric glazing, polymeric trim molding such as reaction injection molding (RIM) that may serve as an interface between side glass and a vehicle bonding flange.

The APAP device 10 includes a voltage supply 18 for supplying voltage to electrode 20 and ground 22 for grounding the APAP device 10. Ionizing gas, e.g. air, is fed into a first chamber 24 through inlet 26. Other ionizing gases can be used to generate plasma streams. Non-limiting examples of ionizing gases for the plasma stream include oxygen, and oxygen diluted in an inert gas, e.g. nitrogen, argon or helium. The ionizing gas exits the first chamber 24 into electrode 20, which is situated within discharge area 28.

Electrode 20 generates a plasma beam 30 that is projected downward through plasma nozzle 32 and exits through outlet 34. The plasma beam 30 contacts bonding surface 14, and in so doing, cleans the bonding surface 14 and activates it for bonding.

The plasma beam 30 can travel along the bonding surface at a velocity in the range of 16 to 840 mm/s according to certain embodiments of the present invention. In other embodiments, the velocity can be in the range of 150 to 450 mm/s. It should be appreciated that the delivery of the plasma beam 30 to the bonding surface 14 can be discontinued and/or continued several times during application. For example, raster patterns with spacings can be used as an application strategy, wherein the beam 30 is discontinued and continued to achieve the desired pattern.

Figure 2:
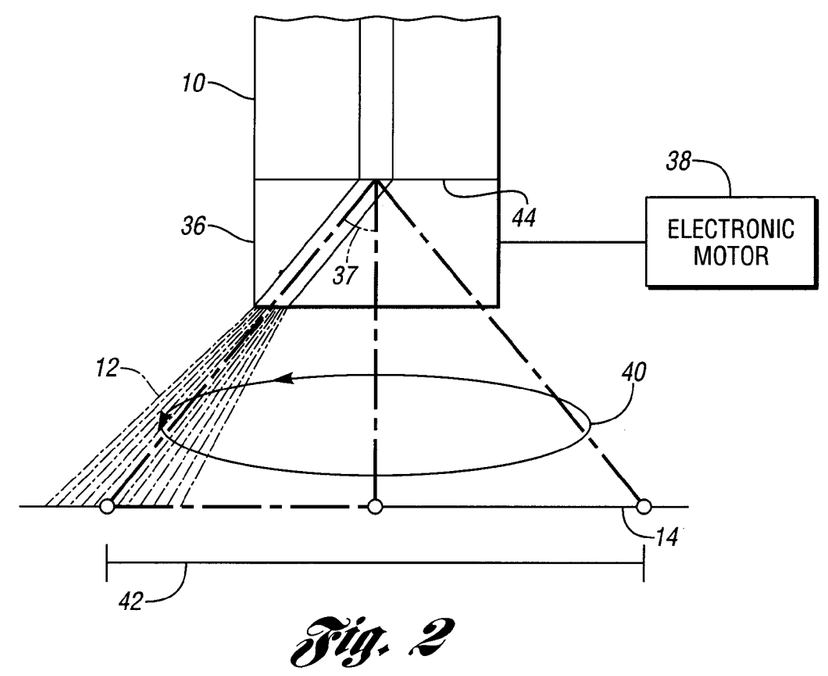
FIG. 2 depicts a cross-sectional, schematic view of an APAP device for providing an angled spray according to one embodiment of the present invention.

In another embodiment, as depicted schematically in cross-section in FIG. 2, an off-axis plasma nozzle 36 having spray angle 37 is attached to APAP device 10. The nozzle 36 is rotated by an electronic motor 38 to produce a substantial cylindrical spray pattern 40. In at least one embodiment, the device 10 and nozzle 36 combination linearly moves above the substrate surface 14 to impart an air plasma treatment of nominal width 42. In certain embodiments, the spray angle is in the range of 0 to 30 degrees; and the rotation speed in the range of 2000 to 3000 revolutions per minute. The linear movement velocity can be in the range of 16 to 300 mm/s. According to this embodiment, the plasma 12 can be applied to the substrate surface 14 in widths of 0.25 to 2.25 inches per treatment pass, and in certain embodiments, 2 inches per treatment pass. It should be appreciated that the treatment width is a function of nozzle spray angle and the height offset between the substrate surface 14 and lower end 44 of APAP device 10.

Figure 3:
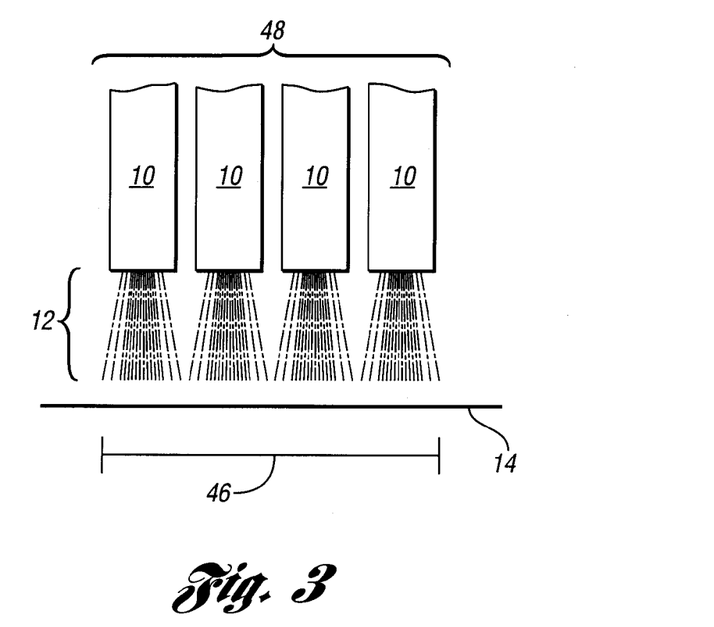
FIG. 3 depicts a cross-sectional, schematic view of a stack of APAP devices according to one embodiment of the present invention.

In another embodiment, as depicted schematically in cross section in FIG. 3, a number of APAP devices 10 are linearly configured to provide a treatment pass of width 46 while traveling in a direction transverse to the linear direction of the configured APAP devices 10. The number of APAP devices can be in the range of two to eight. In FIG. 3, a four APAP device configuration 48 is depicted. In at least one embodiment, each APAP device generates a stream having a 6 mm width, thereby generating a 24 mm treatment width.

According to at least one embodiment, the APAP device can be a device manufactured by PlasmaTreat of PlasmaTreat North America, Inc. of Mississauga, Ontario. According to other embodiments, an APAP device disclosed in U.S. patent application Ser. No. 11/162,741, filed Sep. 21, 2005, can be utilized in accordance with the present invention. The '741 application is herein incorporated by reference in its entirety.

According to at least one embodiment, the present invention includes applying an air plasma to the substrate surface for cleaning and activating the surface prior to bonding. This step can be utilized to pretreat windshield glass prior to bonding. In certain embodiments, the windshield can be at least partially coated with a ceramic frit material. The air plasma pretreatment is especially useful for activating the fritted surface. While not wanting to be bound to any particular theory, the air plasma pretreatment activates the fritted surface by adding hydroxyl groups that can form relative strong covalent bonds with the adhesive.

Figure 4A:
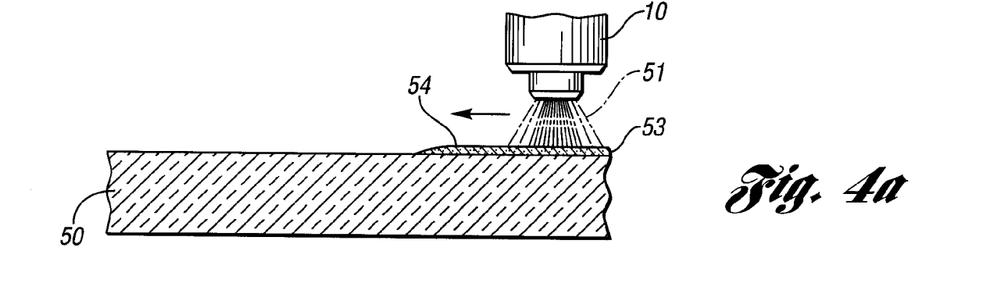
FIGS. 4a and 4b depict fragmented, cross-sectional, schematic views of a windshield pretreatment step and windshield bonding step according to one embodiment of the present invention.
Figure 4B:
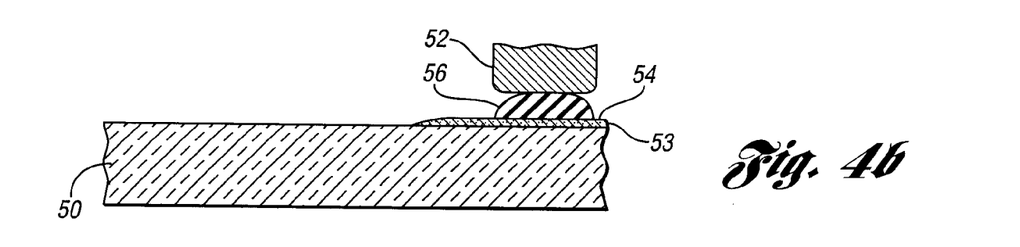

FIG. 4a depicts a fragmented, cross-sectional view of a windshield 50 receiving an air plasma pretreatment 51. Windshield 50 includes a fritted portion 53, which may be covered with contaminants resulting from exposure to a manufacturing environment and/or a slip coat that is typically applied to the edge of the windshield adjacent to the fritted portion to facilitate attachment of a protective molding. The slip coat is typically a silicone based material. APAP device 10 applies an air plasma to clean and activate the bonding surface 54 of windshield 50 prior to bonding. After this step, an adhesive 56, in certain embodiments, a moisture-cured urethane adhesive, is applied to at least a portion of the pretreated area. Other non-limiting examples of adhesives include moisture-cured silicone adhesives, 1-part and 2-part urethane, silicone and epoxy adhesives, butyls, acrylics and cyanic-acrylics, and hot-melt thermoplastic adhesives. Then, the windshield 50 is bonded to frame 52 through adhesive 56, as depicted in FIG. 4b. In certain embodiments, the air plasma cleaning and activation step replaces the one or more solvent cleaning steps used in conventional pretreatment processes.

The air plasma cleaning and activating step can be accomplished manually or robotically, with the air plasma treatment being performed just prior to dispensing a urethane windshield adhesive in a sequential one pass treatment and application. Alternatively, a double pass can be utilized, wherein the first pass is the air plasma treatment and activation step, and the second pass is the application of an adhesive under a similar robot or manual path.

It should be appreciated that glass substrates can be fritted with a ceramic frit compound. According to one embodiment, the adhesive can be selected based on the ceramic frit compound. The following non-limiting parameters that can be considered in selecting the adhesive and glass substrate pair: (1) ceramic frit chemistry; (2) chemistry of the adjoining substrate and/or (3) processing adhesives dictated by the manufacturing plant conditions and production cycle times. According to one embodiment, Dow 15626 urethane adhesive is selected for a Ferro 24-8708 Bi-based fritted glass.

The following non-limiting examples demonstrate the use of the air plasma cleaning and activation process according to certain embodiments of the present invention.

Example 1

Durability tests were conducted on bonded substrates prepared according to one embodiment of the present invention. The preparation of the bonded substrates was conducted under laboratory conditions. A Ferro 24-8708 bismuth-based enamel coated glass tab, available from Ferro Corp. of Washington, Pa. was used as a first substrate. The dimensions of the glass tab were 1×4 inch width by 5.6 mm thickness. A 1×4 inch DuPont Cormax 6 electro-plate immersion de-ionized water coated unpolished cold-rolled steel panel (CRS), available from ACT Laboratories, Inc., was used as a second substrate. The bonding surface of the first substrate was cleaned and activated by the application of an air plasma via the APAP device 10 as shown in FIG. 1. After the air plasma application, the first substrate was joined to the second substrate using the Dow 15626 urethane adhesive, available from Dow Chemical of Midland, Mich.

Figure 5A:
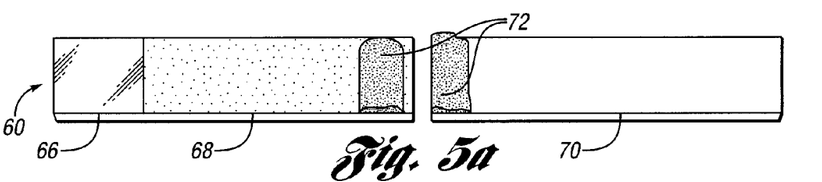
FIGS. 5a, 5b and 5c depict the results of lapshear failure tests on bonded coupons prepared using one or more embodiments of the present invention.
Figure 5B:
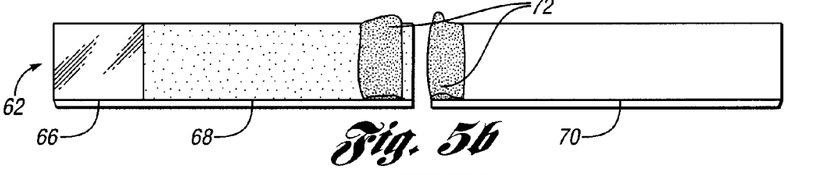
Figure 5C:
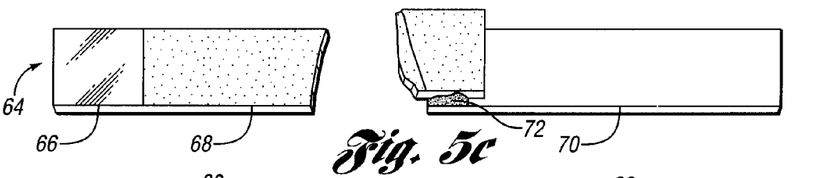

Three bonded samples 60, 62 and 64 were prepared using this process, as shown in FIGS. 5a, 5b and 5c, respectively. The substrates 60, 62 and 64 are depicted after the durability testing was conducted. Each sample 60, 62 and 64 includes a glass tab 66 coated with an enamel 68 and a metal coupon 70, which are joined by an adhesive 72.

Each of the samples was exposed for 2 weeks of 95% relative humidity (R.H.) at 38° C. After the exposure period, each sample 60, 62 and 64 was subjected to a lapshear pull to failure test. FIGS. 5a, 5b and 5c show the results of the tests for samples 60, 62 and 64, respectively.

In each test, the bond between the adhesive 72 and the enamel-coated glass substrate 68, did not fail. Instead, failure occurred cohesively, either within the adhesive 72 or the enamel-coated glass substrate 68. While not wanting to be bound to any particular theory or principle, the results of this test reveal that, under laboratory conditions, good adhesive-to-glass bonding can be achieved directly.

Example 2

Figure 6:
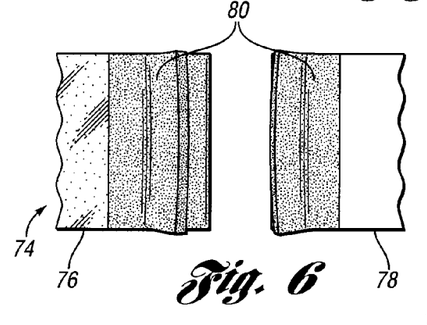
FIGS. 6 and 7 depict the results of lapshear failure tests on bonded coupons prepared using one or more embodiments of the present invention.

Turning to FIG. 6, a durability test was conducted on a bonded substrate sample 74 prepared by bonding an enamel-coated glass substrate 76 and metal coupon 78 with an adhesive 80. The same materials and bonding process of Example 1 were used in Example 2. In contrast to the exposure conditions of Example 1, the sample 74 of Example 2 was exposed to 5 weeks of 95% R.H. at 38° C. After the exposure period, sample 74 was subjected to a lapshear pull to failure test.

FIG. 6 shows the result of this test. The bond between the adhesive 80 and the enamel-coated glass substrate 76 did not fail. Instead, failure occurred cohesively, either within the adhesive 80 or enamel-coated glass substrate 76. While not wanting to be bound to any particular theory or principles, the results of this test reveal that, under laboratory conditions, good adhesive-to-glass bonding can be achieved directly.

Example 3

Figure 7:
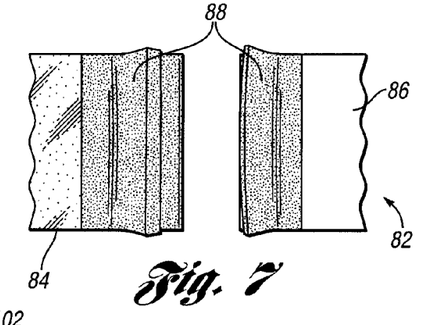

Turning to FIG. 7, a durability test was conducted on a bonded substrate sample 82 by bonding an enamel-coated glass substrate 84 and metal coupon 86 with an adhesive 88. The same materials and bonding process of Example 1 were used in this example. In contrast to the exposure conditions of Example 1, the sample of Example 3 was exposed to 2 weeks of 95% R.H. at 38° C., followed immediately by immersion in water at 69° C. for 2 weeks. After the exposure period, the sample 82 was subjected to a lapshear pull to failure test.

FIG. 7 shows the result of this test. The bond between the adhesive 88 and the enamel-coated glass substrate 84 did not fail. Instead, failure occurred cohesively, either within the adhesive 88 or enamel-coated glass substrate 84. While not wanting to be bound to any particular theory, the results of this test reveal that, under laboratory conditions, good adhesive-to-glass bonding can be achieved directly.

Example 4

Figure 8:
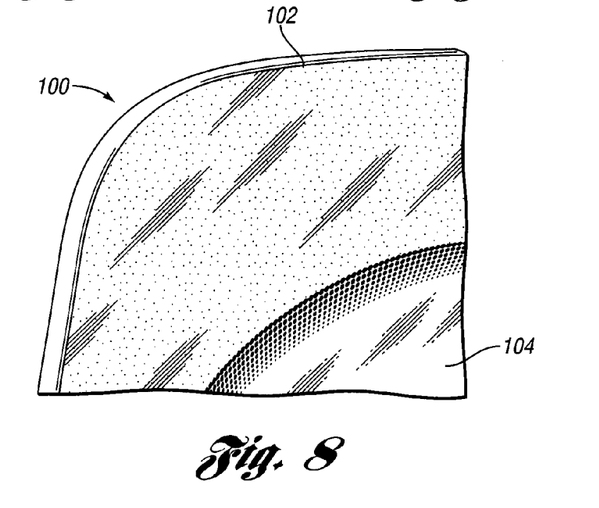
FIG. 8 shows a perspective view of a portion of a relatively dirty windshield according to one embodiment of the present invention.

Turning to FIG. 8, a fragmented perspective view of a windshield 100 is depicted. The windshield 100 includes a fritted portion 102 and a non-fritted portion 104. Windshield 100 is glass material treated with a Zn-based ceramic frit to obtain a fritted portion 102. In certain applications, bonding occurs in at least a portion of the fritted portion 102 during assembly of the windshield to the vehicle frame.

Figure 9:
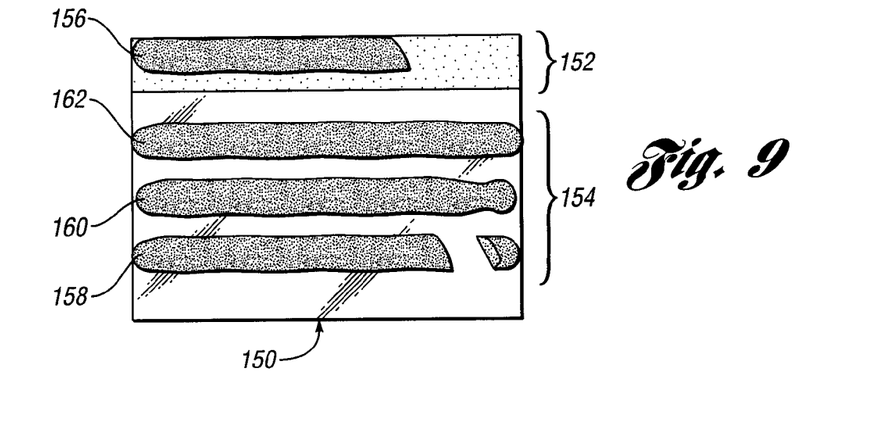
FIG. 9 shows the results of quick knife adhesion (QKA) tests on a dirty glass sample according to one embodiment of the present invention.

FIG. 9 shows a glass substrate 150 used as a windshield sample for purposes of this example. The glass substrate 150 was partially coated with a Zn-based ceramic frit to obtain fritted portion 152. The glass substrate 150 also includes non-fritted portion 154. The glass 150 was exposed to air for a one year period to simulate the conditions in a manufacturing environment. During this time period, contaminants, e.g. dust and dirt, collected on the surface of glass 150.

The dirty surface was assessed for adhesion enhancement by applying adhesive beads 156, 158, 160 and 162 that were air-dried for three (3) days. EFTEC EF7010 urethane adhesive, available from EFTEC North America, L.L.C., Madison Heights, Mich., was used to prepare the adhesive beads. A quick knife adhesion (QKA) test was utilized, wherein the cured adhesive beads were sliced diagonally with a razor blade and then twisted and pulled with pliers until the bead either de-adhered from the glass, or was ripped cohesively in the process.

FIG. 9 shows the QKA test results for dirty glass 150 for the adhesive bead 156 applied to the fritted portion 152 and the adhesive beads 158, 160 and 162 applied to the adjacent non-fritted portion 154. The QKA test shows adhesive failure between the adhesive bead 156 and non-fritted portion 152 and the adhesive bead 158 and non-fritted portion 154. While not wanting to be bound to any particular theory, these results suggest that the dirt remaining on the glass after one (1) year of laboratory exposure was sufficient to disrupt the formation of bond linkages that, under clean conditions, can be achieved directly.

Example 5

According to conventional adhesive-to-glass bonding methods, the fritted glass is typically treated with one or more primers to clean the contaminants and activate the fritted glass for the adhesive bonding step.

According to Example 5, a primerless pretreatment process was employed. The surface of the glass 200 of FIG. 10 was cleaned and activated via application of an air plasma from an APAP device, utilizing a raster pattern with 2 mm spacing between passes at a velocity of 25 mm/s and a distance of 8 mm. The APAP device 10 depicted in FIG. 1 can be used for this application.

Figure 10:
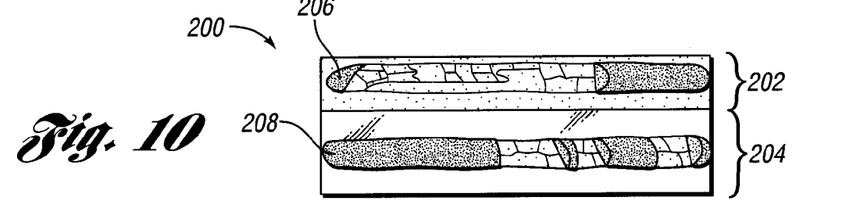
FIG. 10 shows the results of tests on an air plasma pretreated glass according to one embodiment of the present invention.

Glass sample 200 was cleaned and activated using air plasma, and then tested for adhesion. The results of this test are depicted in FIG. 10. Adhesive bead 206 was applied to fritted area 202 and adhesive bead 208 was applied to non-fritted area 204. In this example, adhesive beads 206 and 208 can be removed, only partially from the fritted area 202, and cannot be removed from the adjacent non-fritted area 204. While not wanting to be bound by any theory or principle, this result demonstrates that the glass surface was cleaned from dirt and activated chemically for adhesive bonding through treatment by APAP.

Example 6

A measure of the cleaning ability of the air plasma pretreatment can be demonstrated through surface chemical analysis using X-ray photoelectron spectroscopy (XPS). In this example, a fritted glass with a Zn-based ceramic frit was tested. An air plasma stream rotating at 2000 rpm was passed twice over the fritted glass and adjacent glass surface at a speed of 33 mm/s and distance of 8 mm. The differences in surface chemistry of zinc-based ceramic fritted glass before and after treatment with atmospheric pressure air plasma are shown in Table 1.

TABLE 1

| Sample | Atomic Concentration % | | | | % Reduction in Carbon |
|---|---|---|---|---|---|
| | C | O | Si | Others | |
| Dirty frit | 52.0 | 36.9 | 2.0 | 9.0 | 32.5 |
| Plasma cleaned frit | 35.1 | 48.5 | 2.6 | 13.8 | |
| Dirty Glass | 32.3 | 46.1 | 11.7 | 9.8 | 57.3 |
| Plasma cleaned glass | 13.8 | 58.7 | 16.6 | 11.0 | |

For these treatments, XPS surface analysis revealed that 32.5% of the contaminant carbon layer was removed from the fritted surface, and 57.3% of the carbon layer was removed from the glass surface.

Example 7

Another example of an air plasma cleaning and activation process was demonstrated on a slip coat film contaminated windshield. A slip coat can refer to a silicone-based rubbery material that is used to improve sealing and reduce noise, vibration and harshness (NVH) of a thermoplastic elastomer (TPE) windshield molding.

Figure 11A:
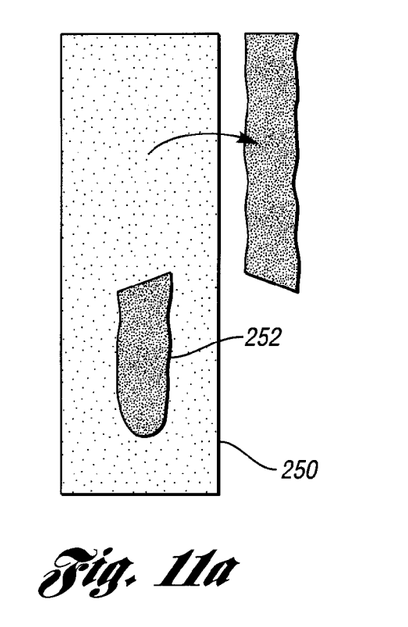
FIGS. 11a and 11b show the results of QKA tests performed on a treated and untreated glass according to one embodiment of the present invention.
Figure 11B:
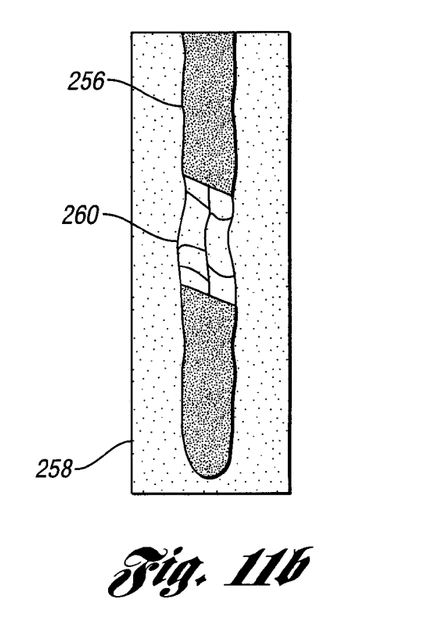

For this experiment, and according to FIGS. 11a and 11b, two 1×4 inch Ferro 24-8708 Bi-based fritted glass coupons 250 and 258 were dipped into a dilute aqueous solution of a slip coat material. The coupons were allowed to air dry, at which point, a film coating was visible on both fritted glass surfaces. Slip coat coated coupon 258 was treated with an air plasma stream rotating at 2000 rpm at a distance of 8 mm and a speed of 50 mm/s. After the treatment, the slip coat film was no longer visible on the frit surface. EFTEC EF7010 urethane adhesive was then applied to both coupons 250 and 258 as adhesive beads 252 and 256 and allowed to dry for three (3) days.

The QKA test was performed on the adhesive beads 252 and 256. FIGS. 11a and 11b show the results of the QKA testing for this example. Coupon 250, which was not treated with air plasma, exhibited facile delamination of the adhesive bead from the fritted glass coupon. The QKA test did not remove the adhesive bead 256 from the coupon 258, which was treated with air plasma. Instead, the adhesive bead tenaciously adhered to coupon 258. In region 260, some cohesive failure occurred, but no delamination.

Example 8

A measure of the cleaning ability of the air plasma pretreatment when a slip coat contaminant is present can be demonstrated through surface chemical analysis using X-ray photoelectron spectroscopy (XPS). In this example, a fritted glass with a Bi-based ceramic frit was tested. An air plasma stream was applied in a raster pattern over the fritted glass and adjacent glass surface at a spacing of 3 mm at a speed of 300 mm/s and distance of 6 mm. The differences in surface chemistry of bismuth-based ceramic fritted glass before and after treatment with atmospheric pressure air plasma are shown in Table 2.

TABLE 2

| Sample | Atomic Concentration % | | | | % Reduction in Silicone |
|---|---|---|---|---|---|
| | C | O | Si as Silicone | Others | |
| Slip coat contaminated frit | 49.7 | 34.4 | 11.6 | 4.4 | 57.8 |
| Plasma cleaned frit | 10.8 | 63.6 | 4.9 | 20.7 | |
| Slip coat contaminated glass | 55.8 | 27.4 | 15.0 | 1.8 | 72.0 |
| Plasma cleaned glass | 15.4 | 59.1 | 4.2 | 21.3 | |

For these treatments, XPS surface analysis revealed that 57.8% of the contaminant silicone layer was removed from the fritted surface, and 72.0% of the silicone layer was removed from the glass surface.

The XPS surface analysis also revealed that the hydroxyl content of the bismuth-based ceramic fritted glass increases from 8.9 weight percent before air plasma treatment to 15.0 weight percent after air plasma treatment.

While not wanting to be bound by any theory or principle, these results demonstrate that the fritted-glass surface was effectively cleaned from the contaminant layer and activated chemically for adhesive bonding.

As required, detailed embodiments of the present invention are disclosed herein. However, it is to be understood that the disclosed embodiments are merely exemplary of an invention that may be embodied in various and alternative forms. While embodiments of the have been illustrated and described, it is not intended that these embodiments illustrate and describe all possible forms of the invention. Rather, the words used in the specification are words of description rather than limitation, and it is understood that various changes may be made without departing from the spirit and scope of the invention.

In accordance with the provisions of the patent statute, the principle and mode of operation of this invention have been explained and illustrated in its various embodiments. However, it must be understood that this invention may be practiced otherwise than as specifically explained and illustrated without departing from its spirit or scope.

What is claimed:

1. A method of treating a glass substrate for bonding, the method comprising:
   providing a glass substrate having a fritted portion of a ceramic frit material and a non-fritted portion, wherein at least a portion of the fritted portion comprises a bondable surface;
   cleaning the bondable surface for subsequent bonding, the bondable surface portion including a bismuth-based ceramic frit material having a hydroxyl content of greater than 15.0 weight percent after cleaning and activating the bondable surface for subsequent bonding,
   wherein the cleaning and activating steps are carried out by applying an air plasma to the bondable surface.

2. The method of claim 1, wherein the bondable surface includes a contaminant layer and the cleaning step at least partially removes the contaminant layer.

3. The method of claim 2, wherein the contaminant layer comprises a slip coat composition.

4. The method of claim 3, wherein prior to the cleaning step, the contaminant layer has an atomic concentration of Si as silicone of greater than or equal to 11.6 percent and after the cleaning step, the contaminant layer has an atomic concentration of Si as silicone of greater than or equal to 5.0 percent.

5. The method of claim 1, further comprising:
   selecting an adhesive composition based on the ceramic frit material; and
   bonding the adhesive composition to the bondable surface of the glass substrate.

6. The method of claim 5, further comprising:
   providing a second substrate; and
   bonding the second substrate to the adhesive composition.

7. A pretreated fritted glass substrate for use in subsequent bonding, the substrate comprising:
   a substrate having a fritted portion, the fritted portion including a bondable surface portion, the bondable surface portion including a bismuth-based ceramic frit material having a hydroxyl content of greater than 15.0 weight percent; and
   a contaminant layer at least partially contacting the bondable surface portion of the substrate, the contaminant layer having an atomic concentration percentage of Si as silicone of greater than zero and less than 5.0 percent.

8. The pretreated fritted glass substrate of claim 7, wherein the atomic concentration percentage of Si as silicone is greater than zero and less than 2.5 percent.

9. The pretreated fitted glass substrate of claim 7, wherein the contaminant layer is comprised of a slip coat composition.

10. The pretreated fitted glass substrate of claim 7, further comprising an adhesive layer at least partially contacting the contaminant layer.

11. A method of providing a glass substrate for bonding to a frame, the method comprising:
   providing a glass substrate having a fritted portion of a bismuth-based ceramic frit material and a non-fritted portion;
   directing an air plasma onto the surface of the fritted portion, the ceramic frit material having a hydroxyl content of greater than 15.0 weight percent after the air plasma and
   applying an adhesive to the fritted portion for subsequent bonding to the frame.

12. The method of claim 11, wherein the directing step includes cleaning the fitted portion for subsequent bonding of the adhesive.

13. The pretreated fitted glass substrate of claim 9, wherein the slip coat composition contains silicone.

14. The pretreated fitted substrate of claim 9, wherein the slip coat composition of the contaminant layer has an atomic percentage ratio between carbon and oxygen (C/O) of greater than zero and smaller than 1.

15. The pretreated fitted substrate of claim 9, wherein the slip coat composition of the contaminant layer has an atomic percentage ratio between carbon and oxygen (C/O) of greater than zero and smaller than 0.5.

16. The pretreated fritted glass substrate of claim 7, wherein the fitted portion is a ceramic frit.

17. The pretreated fitted glass substrate of claim 16, wherein the contaminant layer has an atomic percentage ratio between carbon and oxygen (C/O) of greater than zero and smaller than 1.

* * * * *